Nov. 9, 1926. 1,606,482
E. SCHÜFFTAN
METHOD AND APPARATUS FOR PRODUCING COMPOSITE MOTION PICTURES
Filed Feb. 27, 1925 3 Sheets-Sheet 1

Witnesses
Inventor

Nov. 9, 1926.
E. SCHÜFFTAN
1,606,482
METHOD AND APPARATUS FOR PRODUCING COMPOSITE MOTION PICTURES
Filed Feb. 27, 1925     3 Sheets-Sheet 2
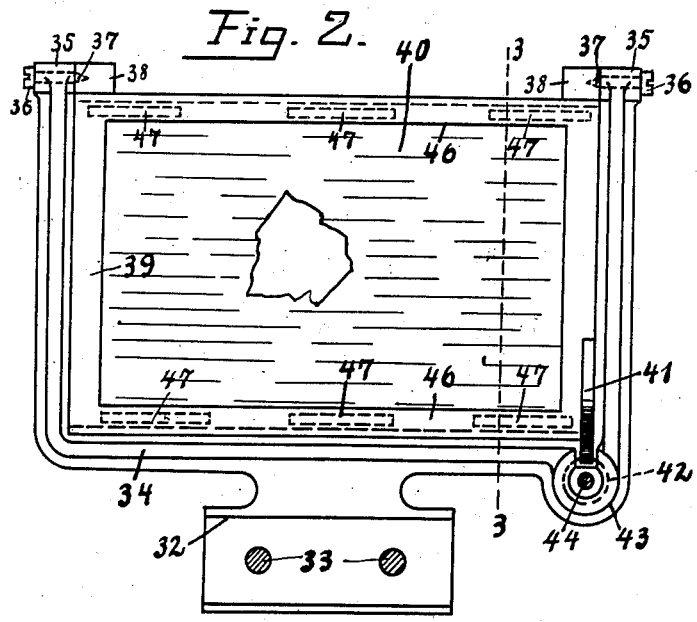
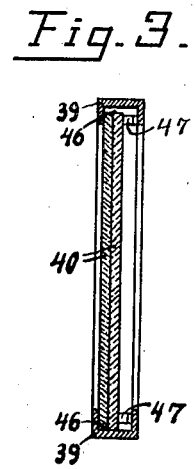
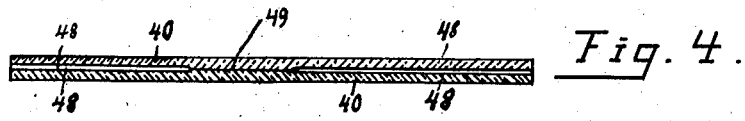
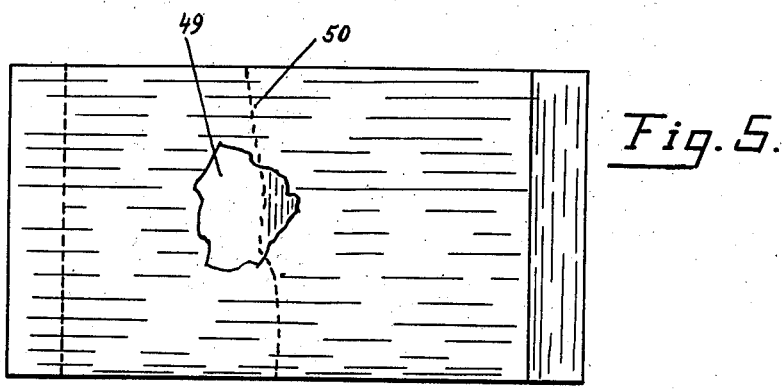

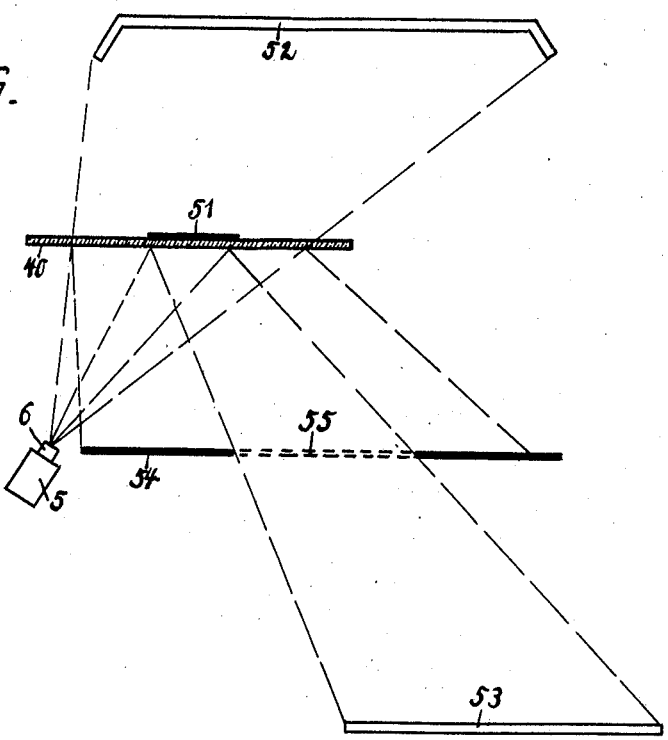
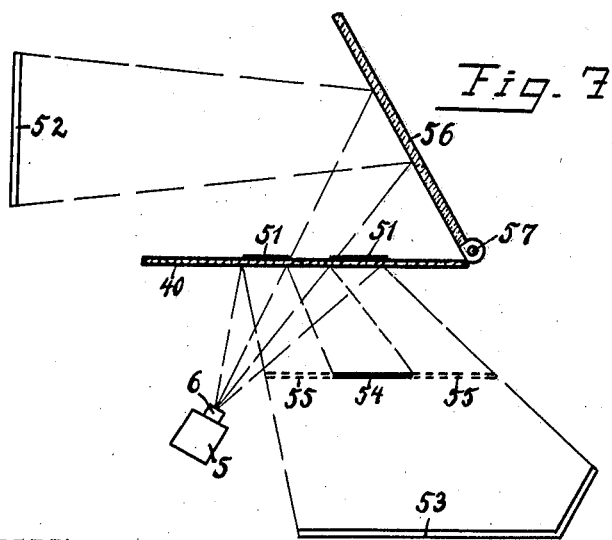

Patented Nov. 9, 1926.

1,606,482

UNITED STATES PATENT OFFICE.

EUGEN SCHÜFFTAN, OF BERLIN-WILMERSDORF, GERMANY.

METHOD AND APPARATUS FOR PRODUCING COMPOSITE MOTION PICTURES.

Application filed February 27, 1925, Serial No. 12,133, and in Germany March 1, 1924.

This invention relates to an apparatus and a method for making composite motion pictures and is an improvement on the method and apparatus described in my Patent No. 1,569,789, dated January 12, 1926.

In the patent I disclosed the miniature reproduction which may represent a model, a painting, a diapositive or photograph located behind the mirror whereby the reality or life sized complementary set or scene is adapted to be photographed by reflection and the miniature was photographed directly through a window in the reflecting surface or mirror. However, the position of the miniature reproduction is immaterial and the reproduction may be placed at such a position that it may be photographed by reflection while the reality or life sized scene is photographed directly through the scratched out portion of the window in the mirror or reflecting surface. For convenience I have employed the words "set or scene" in the description and which may represent a reality, or life sized scene or some such miniature reproduction as a model, a painting, a diapositive or a photograph.

An object of the invention is the provision of an apparatus for making composite motion pictures in which a transparent member is disposed across the light rays from a plurality of sets or scenes and at an angle to the axis of the camera, and having a reflecting surface associated therewith on that face of the transparent member which is opposite the camera and affecting only a portion of said surface whereby complementary portions of both sets or scenes may be simultaneously photographed with the images interfitted and having their adjacent edges blended in a zone of mergence so that no line of demarcation will appear in the composite motion picture.

A further object of the invention is the provision of an apparatus for taking composite motion pictures in which a transparent member is disposed across the light rays of a plurality of sets or scenes and having a reflecting surface affecting only a portion of the transparent member to provide a sight window in the transparent member, through which one of the scenes may be directly photographed while another scene is photographed by reflection, the reflecting surface being located in the unsharp zone of the light rays so that the adjacent edges of the images formed in the camera will be blended into each other in a zone of mergence, the reflecting surface being shiftable transversely of the light rays of the sets or scenes thus providing for various positions of the sight window so that any portion of one of the sets or scenes may be photographed through the sight window simultaneously with the photographing of a complementary portion of the other set or scene.

A still further object of the invention is the provision of a method of taking composite motion pictures of a plurality of sets or scenes and in which a reflecting surface associated with a portion of a transparent member to provide a sight window is disposed across the light rays of the sets or scenes so that one set or scene may be photographed by reflection while the other set or scene is photographed directly through the sight window in the transparent member, the size and shape of the sight window being varied simultaneously with the variation of the size and shape of the reflecting surface for varying the size and shape of the images of the sets or scenes formed in the camera.

Another object of the invention is the provision of arrangement for taking composite motion pictures in which an impeded performance may be had at separate places of action over the whole action area or set or scene.

In the accompanying drawings in which I have illustrated some embodiments of my improved view variation means and some ways for the practical use thereof:

Fig. 2 is a front view of the mirror frame.

Fig. 3 is a section through the frame along line 3—3, Fig. 2.

Fig. 4 is a section through two relatively movable mirror plates.

Fig. 5 is a front view of a modified form of the two mirror plates in a relatively displaced condition thereof, the forward plate having a through-sight window, the rearward plate being provided with a mirror foil part of the plate length only.

Fig. 6 is a diagram illustrating the use of masks for blinding the mirrors.

Fig. 7 is a diagram illustrating the use of a second separately adjustable mirror.

Figure 1:
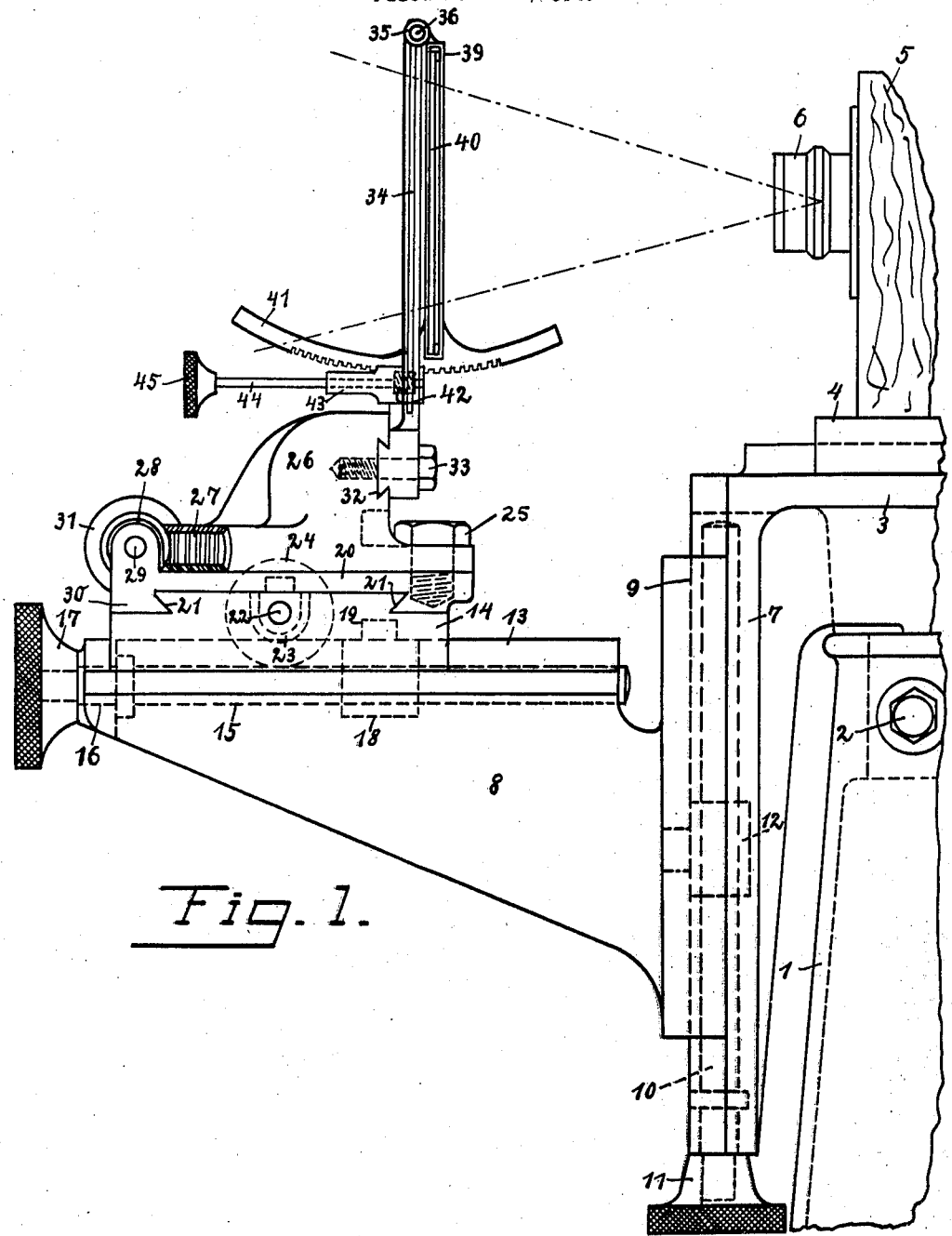
Fig. 1 is a side view of the support for the movable mirror.

According to Fig. 1 I arrange on a frame 1 a support 3 adapted to be locked by means of a screw 2 and on which a carriage 4 can be shifted by means of a nonillustrated spindle, the carriage 4 carrying the taking apparatus 5 having an objective 6. The support 3 is provided with downwardly extending parallel guides 7 on which a bracket 8 is adapted to slide by means of guide flanges 9, the vertical adjustment being effected by a spindle 10 engaging a nut 12 of bracket 8 and having at its lower end a handle 11.

The bracket 8 is at its horizontal upper surface provided with a dovetailed guide 13 on which a carriage 14 is movable by means of a spindle 15. The spindle 15 is supported in the bracket against lengthwise movement by a suitable bearing 16 and can be rotated by a handle 17. It engages with a nut 18 which is fixed to the carriage 14 by means of a stud 19. On the carriage 14 and transverse to its path a second carriage 20 is supported by means of the dovetail-guide 21 and can be moved by means of a spindle 22 having a handle 24 and engaging with a nut 23 of carriage 20.

To the carriage 20 is swiveled on a bolt 25 a bracket 26 having a worm gearing 27 which meshes with a worm 28 adapted to be rotated by means of a shaft 29. This shaft 29 is supported in bearings 30 of carriage or slide 20 and can be rotated by a knob 31, the bracket being thus adapted to effect a rocking movement around a vertical axis passing through bolt 25. On the bracket 26 a frame 34 is supported by dovetail 32 and screws 33, this frame having at its upper ends bearings 35 for screws 36. The screws engage with their points 37 lugs 38 of a frame 39 adapted to receive two mirror plates 40. The frame 39 can be rocked around the screws 36 and is to this end provided with a gear segment 41 engaging with a worm 42 that is supported by bearings 43 of frame 34 and can be rotated by a shaft 44 having a knob 45 at its end.

The two mirror plates are received by channeled guides 46 of frame 39 and are held in snug surface contact by springs 47, the mirrors being so introduced into the frame 39 that they can be moved therealong and that their reflecting foils 48 are lying on each other. According to Fig. 4 both plates 40 are provided with non-foiled through-sight windows 49 permitting a direct viewing of or taking the scenery object or object part arranged opposite the camera, it being clear that upon lengthwise displacement of the two plates 40 within the frame 39 or upon moving them relatively to each other, simultaneously or not simultaneously with such lengthwise displacement, the contour of the through-sight window 49 and thereby the directly and the reflectively taken scenery fields are varied.

In Fig. 5 the two mirror plates 40 are illustrated in a relatively displaced condition, the through-sight window 49 being in this particular instance only arranged at the one mirror plate, for example the forward one, whereas the other mirror plate is only part of its length provided with a mirror foil, the left hand edge of which has been the reference numeral 50. If with the embodiment of Fig. 5 the two mirror plates are in their normal position, that is the mirror foil of the rearward plate 40 behind the window 49 of the forward plate, both plates are practically constituting one mirror reflecting to both sides. If the backward mirror is moved to the right the window 49 is gradually opened and its size and contour gradually changed. For certain optical reasons I prefer not to draw the contour of the through-sight window 49 and the end 50 of the mirror foil of the rearward plate 40 in continuous lines but to give to such lines an irregular or erratic shape. It is further understood that the glass plates 40 should be of such a length, that in no instance an edge of a mirror plate can come within the through-sight window of the other plate upon a variation of the camera view fields, as otherwise optical errors would be produced.

From the foregoing explanation it results that the frame 39 can be locked at 36 around its horizontal axis, that it can be swung vertically around the axis of screw 25 and that the frame can also be transversely shifted by carriage 20. The carriage 14 is used for moving the frame 39 to and from the camera 5, the screw 10 for lifting and lowering the bracket 8 and the mirror-supporting frame 39. By the various mechanism the frame 39 is thus capable of a universal adjustment with relation to the camera and the scenery objects.

In taking composite pictures with the embodiment Figs. 1-5 the two sceneries, the camera, and the reflecting means are suitably positioned so that the camera may take the composite picture by directly viewing at the exclusion of mirror reflection, a certain part or parts of the one scenery and of the performances occurring on or in front of them and by indirectly viewing, by mirror reflection, the picture-complementing portions of the other scenery and its performances, the direct taking being effected through the window 49. In moving the two mirror plates lengthwise within their guide 46 the through-sight window 49 is travelling along the reflecting plane, whereby the directly and indirectly viewed play fields are varied, while the pictorial interfitment of the composite scenery within the taking camera is preserved. It is further possible to relatively move the one mirror plate on the other plate in order to merely effect a variation of the size of the through-sight window or of the proportionship of the directly and indirectly taken scenery portions within the composite picture taken, or to effect such relative movement concurrently with the lengthwise shift of the plates 40 within their supporting frame 39, as will be readily understood.

While I have in Figs. 1–5 illustrated two true silver-foiled mirrors facing each other with their reflecting surfaces I may also use with the same results the so called semi-transparent mirrors having a very finely distributed mirror foil which permits through-sight through the plate but acts as an ordinary mirror when and where provided with a black backing. In using such a semi-transparent mirror, as it is for example supposed to be used in Figs. 6 and 7 I slide into the frame 39 one of such semi-transparent mirrors and a suitably windowed black backing therefor, for example by applying on the rearward plate 40 (Fig. 4) instead of its silver foil 48 a black coating, leaving a window 49 for the through-sight to the one object. The semi-transparent mirror will perfectly reflect at any black backed portion whereas its non-backed portions permit the through-sight to the one object (Fig. 6). The semi-transparent mirror together with its black backing is thus operating exactly as the two mirror plates 40 shown in Figs. 1 to 5. For varying the play fields the windowed backing may be moved along the stationary remaining semi-transparent mirror plates or both the mirror plates and its backing may be simultaneously moved within the guides 39. In order to vary the size of the through-sight window one may associate the semi-transparent mirror with two relatively movable and suitably windowed backings. All of this is believed to be entirely clear from the foregoing explanations and to require no particular illustration.

In Figs. 6 and 7 the use of the afore described universally adjustable mirror means is illustrated, 5, 6 being the taking camera, 52 and 53 the respective scenery objects. 40 designating the universally adjustable mirror means permitting variation of the play fields, 51 being the foil or the black backing respectively of the mirror the support of which corresponding to Figs. 1–3 and being not illustrated in these particular figures. In using semi-transparent mirrors it is preferable, in order to keep off any objectionable light influences, to interpose between the mirror system 40 and the reflected object 53 a black mask 54 having a window 55 corresponding as to its outline to the mirror backing 51 and being so associated with the mirror 40 by any suitable means, that it is moved or the size of its window 55 varied in accordance with the variation of the mirror position and of the size of the mirror through-sight.

With the embodiment according to Fig. 6 the outer portions of object 52 are directly taken whereas the object 53 is indirectly taken by the reflection at 51. It is obvious that in shifting such reflecting portion along the plate 40 or in varying its size by any suitable means the directly and indirectly taken sections of objects 52 and 53 will vary accordingly.

In the embodiment according to Fig. 7 the semi-transparent mirror 40 is provided with a windowed black backing 51 cooperating with a mask 54 having windows 55 corresponding to the backing portions 51. This embodiment results in the direct taking of the central portions of object 52 and the indirect taking of the outer picture-complementing portions of scenery 53. The embodiment further differs from that according to Fig. 6 in that a further deflecting mirror is interposed between object 52 and camera 5. Such arrangement will be effected, if the size of the taking studio is for example too small as to permit an unimpeded positioning of the respective scenery object. In Fig. 7 this additional or deflecting mirror 56 is shown as rotatable around a vertical axis 67. In actual practice I provide the standard 1 above the camera with an additional downwardly extending and universally movable mirror supporting frame 39 by duplicating above the camera the mirror supporting means shown in Figs. 1–3 as will be readily understood without particular illustration.

The objects 52, 53 may be real scenery objects or they may be diapositive plates, picture photographs or film projections or the like and they may further be combined with many of the well known means of producing trick films as will be readily understood by those skilled in the cinematographic taking art.

What I claim as my invention is:—

1. An arrangement for producing composite motion pictures comprising a plurality of sets or scenes, a camera, a transparent member disposed across the path of the light rays from the sets or scenes and having a reflecting surface covering a portion of the transparent member to provide in the transparent member a sight window through which one of the sets or scenes may be photographed, the transparent member and reflecting surface being disposed in front of the camera and at an angle to the axis of the camera so that a portion of the other set or scene may be photographed by reflection, means for supporting the reflecting surface in front of the camera and means for causing shifting of the supporting means, the transparent member, and the reflecting surface transversely of the light rays from the first mentioned set or scene which pass through the sight window in the transparent member and also across the light rays of the other set or scene impinging on the reflecting surface so that the sight window will also be shifted transversely of the light cone for photographing other portions of the first set or scene through the sight window and simultaneously with a reflected complementary image of the other set or scene.

2. An apparatus for producing composite motion pictures of a plurality of sets or scenes comprising a camera, a transparent member having a reflecting surface covering a portion of the transparent member to provide a sight window through the transparent member for a direct taking of one of the sets or scenes, said transparent member being located between said last mentioned set or scene and the camera and so positioned across the axis of the camera and relative to the other set or scene and camera that while a portion of the first mentioned set or scene may be photographed through the window in the transparent member, a complementary portion of the other scene may be photographed by reflection, and a second reflecting surface movable adjacent the first mentioned reflecting surface for varying the size and shape of the window and for increasing the reflecting surface at the window.

3. An apparatus for producing composite pictures of a plurality of sets or scenes comprising a camera, a transparent member having a reflecting surface covering a portion of the transparent member to provide a sight window through the transparent member for a direct taking of one of the sets or scenes, said transparent member being located between the last mentioned set or scene and the camera and so positioned across the axis of the camera and relative to the sets or scenes and camera that while a portion of the first mentioned set or scene may be photographed through the window in the transparent member, a portion of the other set or scene may be photographed by reflection, and means movable adjacent the window for varying the size and shape of said window and for varying the size and shape of the reflecting surface.

4. An apparatus for producing composite motion pictures of a plurality of sets or scenes comprising a camera, a transparent member, a reflecting surface on the transparent member and having a portion of the reflecting surface thereof removed to provide a sight window through the transparent member for a direct taking of one of the sets or scenes, said transparent member being located between the last mentioned set or scene and the camera and so positioned across the axis of the camera and relative to the sets or scenes that a portion of the other set or scene may be photographed through the window in the transparent member while a complementary portion of the other set or scene may be photographed by reflection, a second transparent member having a reflecting surface adjacent the first mentioned reflecting surface and movable relative to the first mentioned transparent member so that the second mentioned reflecting surface will be moved across the window for varying the size and shape of the window and for varying the size and shape of the images formed in the camera of the sets or scenes.

5. An apparatus for producing composite motion pictures of a plurality of sets or scenes comprising a camera, a mirror having a sight window therein, said mirror being located between one of the sets or scenes and the camera and so positioned relative to the camera that the last mentioned set or scene may be photographed directly through the sight window while the other set or scene may be photographed by reflection, a second mirror movably positioned relative to the window and adapted to vary the size and shape of the window and increase the reflecting surface at the window.

6. An apparatus for producing composite motion pictures of a plurality of sets or scenes comprising a camera, a transparent member having a reflecting surface covering a portion of the transparent member, the uncovered portion of the transparent member providing a sight window through the transparent member for a direct taking of one of the scenes, said transparent member being located between the last mentioned set or scene and the camera and so positioned across the axis of the camera and relative to the sets or scenes that a portion of the first mentioned set or scene may be photographed through the window in the transparent member while a complementary portion of the other set or scene may be photographed by reflection, and a second transparent member having a reflecting surface adjacent the first mentioned transparent member, said transparent members being movable relative to each other for varying the size and shape of the window of the first mentioned transparent member and for increasing the reflecting surface at said window.

7. An apparatus for producing composite motion pictures of a plurality of sets or scenes comprising a camera, a transparent member having a reflecting surface covering a portion of the transparent member to provide a sight window for a direct taking of one of the scenes, said transparent member being located between the last mentioned set or scene and the camera and so positioned across the axis of the camera and relative to the sets or scenes and camera that a portion of the first mentioned set or scene may be photographed through the window in the transparent member while a complementary portion of the other set or scene may be photographed by reflection, a second reflecting surface movable adjacent the first mentioned reflecting surface for varying the size and shape of the window and for increasing the reflecting surface at the window, and means for swingably supporting the transparent member so that said transparent member may be moved at an angle to the axis of the camera.

8. An apparatus for producing composite motion pictures of a plurality of sets or scenes comprising a camera, a transparent member located between one of the sets or scenes and the camera and having a reflecting surface covering a portion of the transparent member to provide a sight window through the transparent member for a direct taking of the last mentioned set or scene, an image of the other scene being reflected into the camera, means for swinging the transparent member across the axis of the camera, a second transparent member having a reflecting surface covering a portion thereof, said second transparent member being movable relative to the first mentioned transparent member so that the second reflecting surface will be movable across the face of the sight window of the first mentioned transparent member for varying the size and shape of the window and the reflecting surface at the window.

9. An apparatus for producing composite motion pictures of a plurality of sets or scenes comprising a camera, a transparent member located between one of the sets or scenes and the camera having a reflecting surface covering a portion of the tranparent member to provide a sight window through the transparent member for a direct taking of one of the scenes, means for swinging the transparent member across the axis of the camera, a second transparent member having a reflecting surface covering a portion thereof, said second transparent member being movable relative to the first mentioned transparent member and across the face of the sight window in the first mentioned transparent member for varying the size and shape of the window and for increasing the reflecting surface at the window, said second mentioned transparent member being carried by the swinging means for the first transparent member.

10. The art of making composite motion pictures of a set or scene and a second set or scene which comprises arranging a light transmitting member having a reflecting surface thereon between the first set or scene and a camera, removing a portion of the reflecting surface from the light transmitting member, forming an image of the first set or scene in the camera directly through the uncovered portion of the light transmitting member, forming an image of the second set or scene in the camera by reflection, varying the area of the reflecting surface while varying the size and shape of the images of the sets or scenes, and photographing the images of the sets or scenes.

11. The art of making composite motion pictures of a set or scene and a complementary set or scene which comprises arranging a light transmitting member between the first set or scene and a camera, masking a portion of the light transmitting member and at the same time providing a reflecting surface on the masked portion of the light transmitting member, the unmasked portion of the light transmitting member forming a sight window so that the first set or scene may be directly photographed through the sight window, forming a portion of an image of the first set or scene in the camera through the light transmitting member, and reflecting a complementary portion of an image of the complementary set or scene in the camera, increasing the reflecting surface at the sight window while varying the size and shape of the first mentioned image and the size and shape of the second mentioned image, and photographing the images of the sets or scenes.

12. The art of making composite motion pictures of a set or scene and a second set or scene, which comprises arranging a light transmitting member between a camera and the first set or scene, masking with a reflecting surface on the transparent member a portion of the first set or scene, forming in the camera an image of the unmasked portion of the first set or scene directly through the light transmitting member, reflecting an image of a portion of the second set or scene in the camera, blending in a zone of mergence the adjacent edges of the images into each other, arranging a second reflecting surface in juxtaposition with the light transmitting member, varying the size and shape of the image of the second mentioned set or scene while varying the size and shape of the image of the first mentioned set or scene with the second reflecting surface, then photographing the images of the sets or scenes.

13. An arrangement for producing composite motion pictures comprising a plurality of sets or scenes, a camera, a transparent member disposed across the light rays from the sets or scenes having a reflecting surface covering a portion of the transparent member, the portion of the transparent member which is uncovered providing a sight window through which one of the sets or scenes may be photographed, the transparent member and reflecting surface being disposed in front of the camera and at an angle to the axis of the camera so that a complementary portion of the other set or scene may be photographed by reflection, means for supporting the transparent member with the reflecting surface in front of the camera, said transparent member being slidable in a plurality of different directions in the supporting means and across the axis of the camera so that the sight window will also be shiftable transversely of the light rays from the sets or scenes for photographing other portions of the first set or scene through the sight window and simultaneously with the reflected complementary image of the other set or scene.

14. An arrangement for producing composite motion pictures comprising a plurality of sets or scenes, a camera, a transparent member disposed in front of the camera and across the light rays from the sets or scenes, a mask associated with a portion of the transparent member and providing for a window in the transparent member through which one of the sets or scenes may be photographed, and also for a reflecting surface, the transparent member and reflecting surface being positioned at an angle to the axis of the camera so that the other set or scene may be photographed by reflection, means for supporting the mask, said mask being slidably mounted and movable in a plurality of different directions in the supporting means and across the axis of the camera for not only varying the position of the reflecting surface but also for varying the position of the window so that various portions of the first mentioned set or scene may be photographed through the window and simultaneously with a complementary portion of the other set or scene.

15. An arrangement for producing composite motion pictures comprising a plurality of sets or scenes, a camera, a transparent member disposed in front of the camera and across the light rays of the sets or scenes, a mask associated with a portion of the transparent member and providing for a window in the transparent member through which one of the sets or scenes may be photographed and also for a reflecting surface, the transparent member and reflecting surface being positioned at an angle to the axis of the camera so that the other set or scene may be photographed by reflection, a second mask slidably mounted adjacent the first mask and providing for additional reflecting surface at the window for simultaneously varying the size and shape of both images formed in the camera.

In testimony whereof I have affixed my signature.

EUGEN SCHÜFFTAN.